(12) United States Patent
Schottdorf

(10) Patent No.: US 8,986,507 B2
(45) Date of Patent: Mar. 24, 2015

(54) CONTINUOUSLY CONVERTING BIOMASS

(75) Inventor: Bernd Schottdorf, Schloss Duttenstein (DE)

(73) Assignee: European Charcoal AG, Baar (CH)

( * ) Notice: Subject to any disclaimer, the term of this patent is extended or adjusted under 35 U.S.C. 154(b) by 561 days.

(21) Appl. No.: 13/266,748

(22) PCT Filed: Mar. 10, 2010

(86) PCT No.: PCT/EP2010/001432
§ 371 (c)(1),
(2), (4) Date: Dec. 19, 2011

(87) PCT Pub. No.: WO2010/124761
PCT Pub. Date: Nov. 4, 2010

(65) Prior Publication Data
US 2012/0079762 A1    Apr. 5, 2012

(30) Foreign Application Priority Data

Apr. 27, 2009   (DE) .......................... 10 2009 019 060
Jun. 23, 2009   (DE) .......................... 10 2009 030 013

(51) Int. Cl.
*C10B 33/00*   (2006.01)
*C10B 39/02*   (2006.01)
(Continued)

(52) U.S. Cl.
CPC ................. *C10B 39/02* (2013.01); *C10B 49/06* (2013.01); *C10B 53/02* (2013.01); *C10C 5/00* (2013.01); *C10L 5/447* (2013.01); *Y02E 50/14* (2013.01); *Y02E 50/10* (2013.01); *Y02E 50/30* (2013.01)
USPC ...... 201/3; 201/30; 201/32; 201/40; 202/120; 202/150; 202/221; 585/240

(58) Field of Classification Search
CPC .......... C10B 47/28; C10B 47/04; C10B 47/16
USPC .................... 585/240, 242; 201/3, 32, 40, 30; 202/120, 150, 221
See application file for complete search history.

(56) References Cited

U.S. PATENT DOCUMENTS 2,289,917 A * 7/1942 Lambiotte ........................ 201/34
4,115,202 A * 9/1978 Lorenz et al. .................... 202/99
(Continued)

FOREIGN PATENT DOCUMENTS

CH    219891 A    3/1942
DE    372941 C    4/1923
(Continued)

OTHER PUBLICATIONS

European Patent Office, International Search Report for International Application No. PCT/EP2010/001432, mail date Oct. 9, 2010, pp. 1-6.

*Primary Examiner* — Nina Bhat
(74) *Attorney, Agent, or Firm* — SoCal IP Law Group LLP; Mark A. Goldstein

(57) ABSTRACT

Methods, devices and systems for continuously converting biomass are described herein. A device has a feed section for holding a moving bed of biomass, namely wood, having a drying section, a flame zone for degassing, and a, smolder zone for carbonizing the biomass into a solid converted product, namely charcoal. The device includes a tank for collecting the solid converted product arranged below a grate and coupled with the feed section in a gas-tight manner. The system comprising the device, a biogas plant and/or a combined heat and power plant conveys the liquid converted product, namely pyroligneous acid or acetic acid, to the biogas plant and/or the solid converted product, namely charcoal, to the combined heat and power plant.

23 Claims, 3 Drawing Sheets

(51) Int. Cl.
*C10B 49/06* (2006.01)
*C10B 53/02* (2006.01)
*C10C 5/00* (2006.01)
*C10L 5/44* (2006.01)

(56) References Cited

U.S. PATENT DOCUMENTS 4,465,556 A * 8/1984 Bowen et al. .................. 202/99
4,935,099 A * 6/1990 Weiss et al. .................. 201/27
5,584,970 A * 12/1996 Schmalfeld et al. ............ 201/27
6,941,879 B2 * 9/2005 Hahn et al. .................... 110/341
8,475,726 B2 * 7/2013 Balint et al. .................. 422/198
8,567,086 B2 * 10/2013 Kanai .............................. 34/59

FOREIGN PATENT DOCUMENTS

| DE | 102005038135 | * | 3/2007 |
| DE | 102005038135 B3 | | 3/2007 |
| FR | 881921 A | | 5/1943 |
| WO | WO 2010124761 | | 11/2010 |

* cited by examiner

CONTINUOUSLY CONVERTING BIOMASS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/EP2010/001432, filed Mar. 10, 2010 entitled, "DEVICE, USE THEREOF, METHOD AND SYSTEM FOR CONTINUOUSLY CONVERTING BIOMASS", which claims priority to German Patent Application No. 10 2009 019 060.0, filed Apr. 27, 2009 entitled, "DEVICE, USE THEREOF, METHOD AND SYSTEM FOR CONTINUOUSLY CONVERTING BIOMASS", and German Patent Application No. 10 2009 030 013.9, filed Jun. 23, 2009 entitled, "DEVICE, USE THEREOF, METHOD AND SYSTEM FOR CONTINUOUSLY CONVERTING BIOMASS", all of which are incorporated herein by reference in their entirety.

BACKGROUND

1. Field

The disclosure relates to a device, use thereof, a method and a system for continuously converting biomass, and in particular a device, a method and a system in which biomass is dried, degassed, carbonized and collected.

2. Description of the Related Art

The prior art is briefly summarized below.

DE 10 2005 038 135 B3 discloses a device for continuously producing charcoal in a moving bed of wood or other biomass. The device comprises a feeder device for wood or other biomass, a shaft in which the moving bed of wood or other biomass is held, dried, degassed and carbonized, one or a plurality of air feed elements in the lower section of the shaft and a grate in the lower section of the shaft. The charcoal which passes through the grate is captured and cooled in a water basin and conveyed out of the water basin, and must then be dried prior to further use.

DE 3517972 A1 discloses a combined removal and cooling device for charcoal from reverse flow carbonization systems. To reduce the thermal load on the removal elements, and to avoid incorrect entry of air into the carbonization chamber, which would cause the charcoal to burn off uncontrollably, the charcoal is pre-cooled at the water-cooled walls of a trough prior to reaching a helical removal chute in the base of the trough that conveys the charcoal out of the trough, which is open at the sides.

EP 1 473 351 A discloses a method and system for smokeless production of charcoal. The feedstock, e.g. wood or bamboo, is subjected to very high heat. The heat is produced by burning the gases released when the material is heated. The material is not completely combusted, but rather the burn-off process is regulated via the in-feed of air. The system comprises a material feed opening through which the material is fed in. The material is then sequentially carbonized in a chamber, initially being degassed and dried. This releases carbon dioxide, carbon monoxide and pyroligneous acid: the released gases pass sideways and upwards at the base of the chamber through a chimney extending parallel to the chamber. The porous carbonaceous product (charcoal) falls through a grate in the base of the chamber onto a chute and then via a conveyor system into a collection tank. Liquid coolant flows through the walls of the chute, thus cooling the porous carbonaceous product. Once full, the collector can be removed via a flap for emptying on the outside.

EP 1 508 607 discloses a reactor for producing charcoal. The reactor can be continuously fed with feedstock (wood) from above, and on the reactor's lower side carbonized products are removed by a conveyor system and pass into a sealable container. Carbonization in the reactor is controlled by an air feed device. In the lower part of the reactor a perforated basket, in which the carbonization material is carbonized, is provided. Outside air enters through the holes in the perforated basket. The basket is conical in shape and has a small opening pointing upwards. The conical shape allows the length of time the carbonization material remains in the area of the perforated basket to be controlled. The released gas produced during the cooling process passes through a smoke removal pipe in the upper section of the reactor to a separator, which precipitates wood oil.

DETAILED DESCRIPTION

Figure 1:
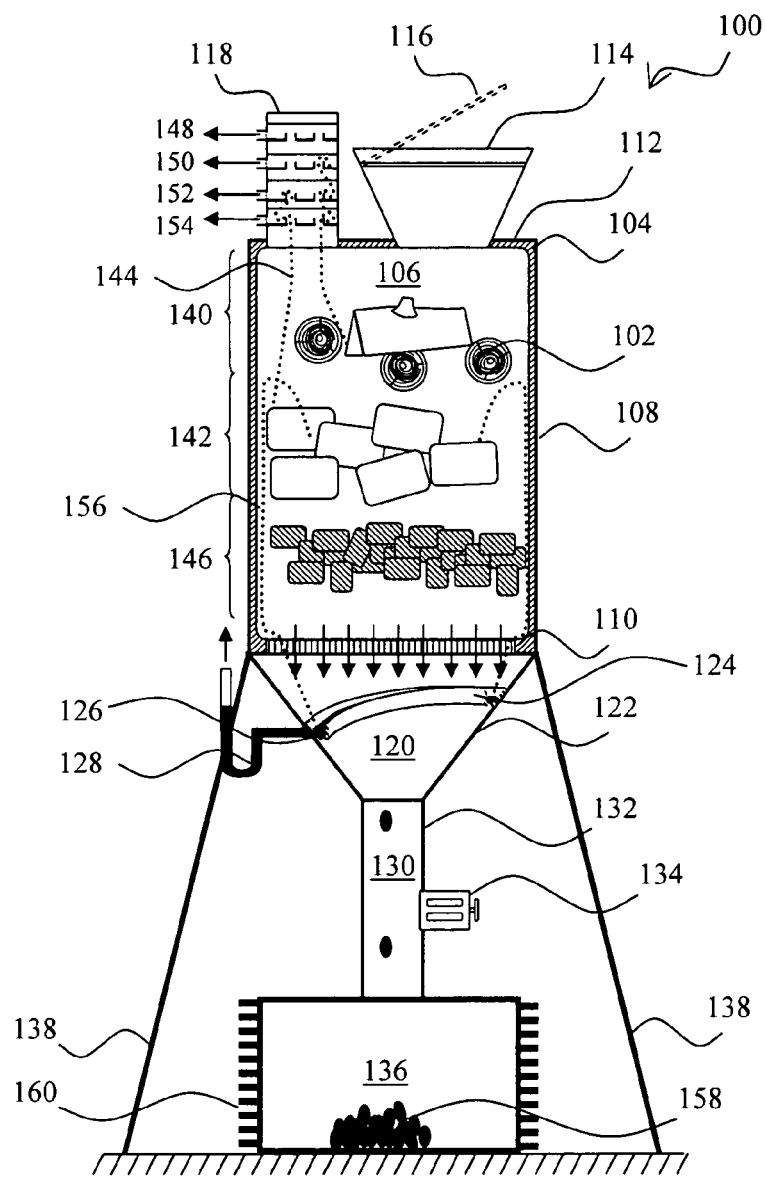
FIG. 1 is a schematic longitudinal cross-section through a device to continuously convert biomass.

This application describes an improved and simplified device, use thereof, method and system for continuously converting biomass.

Variants and exemplary embodiments of the method, device and system for continuously converting biomass are set forth in the description and the drawings.

In one embodiment, a device for continuously converting biomass comprises a feed section for holding a moving bed of biomass, in particular wood, having: an upper section for drying, a middle section (a flame zone for degassing), and a lower section (a smolder zone for carbonizing biomass into a solid converted product, in particular charcoal); a grate, which supports the moving bed and allows the solid converted product to pass downwards through it, wherein a collection tank is provided which collects the solid converted product, is situated beneath the grate, is couplable with the feed section in a gas-tight manner against the outside air, and has a wall area having a cooling device.

As a result, there is no need for a water basin for halting the carbonization process. All that is required is a sealed, cooling collection tank. This means the solid converted product, a carbon concentrate, i.e. a converted product which essentially comprises carbon, e.g. charcoal, does not have to be removed wet from a cooling water basin and then dried, but rather is immediately ready for further use following cooling in the collection tank.

Moreover, because the collection tank is arranged (directly) below the grate, the solid converted product falls into the collection tank due to gravity alone. This means there is no need for any additional conveying means, nor for any cooling thereof, as is the case in DE 3517972 A1, nor is a cooled chute required as in EP 1 473 351 A1.

Thanks to the simple design of the conversion device described herein, it is easy to achieve a join that is gas-tight against the outside air at the interface between the collection tank and the feed section. As a result, the conversion process is reliably halted in the collection tank, because the temperature is lowered and because combustion gases and oxygen from the air stay in the feed section (chimney effect), and hence the carbonization process is interrupted in two ways.

Essentially any type of biological solid fuel per DIN prEN 14961-1:2009 is suitable, in particular the following origin classifications: chipped forestry wood, plantation wood, industrial wood or used wood or mixtures thereof. These origin classifications can be further sub-categorized in terms of their traded form: pieces of wood, e.g. billet wood; wood chips (hereinafter generally referred to as chips), e.g. wood chips created using cutting tools; shredder material, e.g. wood chips created using blunt, destructive tools; pellets or briquettes.

Forestry and/or plantation wood comprises in particular complete trees, logs, residual forestry wood, stumps, bark and wood-like biomass from agricultural maintenance. Industrial wood may comprise chemically untreated residual wood, chemically treated residual wood, or fibrous residue from the pulp and paper industry. Used wood essentially comprises chemically treated and untreated wood.

Chopped wood-type biomass is valuable, as it can be produced by machine, e.g. from waste products of forestry operations. Chopped wood-type biomass may be less unwieldy than non-chopped wood-type biomass and hence more easily transportable.

As well as wood-type biomass, stalk-type biomass such as cereals and grasses and biomass from fruit are also suitable.

Chips which have a high moisture content and can only be stored for limited periods, in particular chips with a moisture content >30%, are also suitable.

If for example chips from chopped, recently harvested wood with a high moisture content of more than 30% or more than 50% are produced, when stored the piled-up chips may heat up as a result of biological conversion processes and spontaneously combust. Furthermore, harmful molds may arise. High moisture levels are favorable conditions for fungi destructive to wood, which may diminish the chips' energy content.

For these reasons, non-chopped wood is often pre-dried and then subjected to a further drying process as chopped chips. However, this is time-consuming and requires storage capacity that may require a roof and ventilation as well as already high-quality chopped material, i.e. chips with a moisture content <30% in coarse, sharp-edged shapes with edges measuring around 5 cm in length, from which green material and fine material has been removed, to ensure sufficient interstitial space for air circulation and further drying once the material has been tipped into the storage area.

The device described herein may also be used to convert poor-quality produced chips, i.e. chips with a moisture content of >30% and/or fine material content and/or green material content and/or in a pulpy condition and/or with a significant needle and/or leaf content, into valuable charcoal. The device described herein thus eliminates or reduces the need to do the following: pre-dry the non-chipped wood; subject the chips to a further drying process; remove any fine material, green material, needles and leaves; assign time and storage capacity. Furthermore, the converted product charcoal has a lower mass per unit of calorific value than chips, and transport costs for charcoal are thus generally lower.

The size of elements in the biomass and/or bulk density of the biomass (i.e. the mass/volume of the biomass in tipped state) may inter alia affect the flow behavior of the moving bed of biomass. In particular, high bulk density of a biomass in the feed section results in higher pressure on the grate than would occur with biomass of lower bulk density, based on the same volume. The pressure on the grate may be modified inter alia via the following measures: increase or decrease the size of the feed section; high or low filling height of the biomass held in the feed section; compress or loosen the biomass using a compression device (e.g. a straw chopper or press) or loosening device (e.g. a rake), or modify the size of the openings in the grate. To accomplish this, openings in the grate in the feed section may be embodied for example as adjustable, so that the openings can be used to control the size of the coals and the flow rate of the biomass. Furthermore, the grate may be exchanged with a different grate, or expanded using an additional grate, in order to implement openings of different sizes.

According to a further refinement, the collection tank is connected with the feed section via a funnel having its wider end facing the feed section and/or a pipe.

With regard to the manner in which the collection tank is connected to the feed section, there are three types of embodiment:

First type: The collection tank is connected to the feed section via a pipe. This maintains the advantage that the solid converted product falls into the collection tank due to gravity and is collected there. Thanks to the pipe, which if necessary has a fairly small cross section, the temperature difference between the cooled collection tank and the smolder zone in the feed section is increased, which constitutes a more effective screen against the heat radiating from the smolder zone. This aids the cooling process in the collection tank, and furthermore the conversion process in the feed section takes place with less thermal loss.

Second type: The collection tank may be connected to the feed section via a funnel having its wider end facing the feed section. This has the advantage that the container only requires a small sealable opening, and nonetheless the solid converted product falls into the collection tank due to gravity and can be collected there. This allows for a simpler design and improves thermal decoupling between the collection tank and the feed section.

Third type: The collection tank may be connected via a pipe and via a funnel which is connected to the pipe and has its wider end facing the feed section. This enables one to combine the advantages of the first two types.

In addition, further devices (removal means, ventilation, temperature measurement etc.) may be provided in the area of the funnel and pipe).

According to a further refinement, the collection tank is removably coupled with the feed section and/or a discharge device is provided on the collection tank to allow the solid converted product to be taken out. Preferably the collection tank may also have an interchangeable compartment.

The collection tank may also be coupled to the feed section via prior-art mechanisms such as sockets, gaskets or sleeves. The mechanism may be opened and removed as necessary to decouple the collection tank from the feed section.

The collection tank may also be equipped with wheels, rollers or similar elements, so that a first collection tank, once it has been filled with the solid converted product and the latter has cooled, may be swapped with a second, empty collection tank. An advantage of swappable collection tanks is that they may also be used as transport containers.

Furthermore, the solid converted product, which has been collected and has cooled in the collection tank, may be removed using a discharge device such as a flap, sweeper, rotary conveyor or similar.

The collection tank may also comprise a removable compartment. The compartment may be designed as a container (trough) which is open in the upwards direction and is arranged in the collection tank so that it can collect the solid converted product and/or cool it. The compartment may be removed from the collection tank via a closable flap which is sealed tight against the outside air and swapped with an empty one. The interstitial space between the collection tank and the compartment may also contain coolant.

For example, the collection tank may be embodied as a rotatable swappable magazine. If so, a magazine element— once it is full of solid converted product and the solid converted product has cooled—may be rotated away from the funnel and/or feed section, and at the same time an empty magazine element may be inserted and coupled such that it is gas-tight against the outside air. This allows continuous ongoing operation without any loss associated with the removal process.

According to a further refinement, between the grate and the collection tank an air inlet is provided, via which controllable amounts of air may be let in. The air inlet is preferably embodied as two tubes which fit into one another, each having longitudinal slits in their walls.

Each tube, e.g. the inner tube, is rotatable, e.g. relative to the outer tube, and/or is slidable longitudinally. One of the tubes is closed on one its front faces. The longitudinal slits of each tube may be arranged in the sidewalls so that they are aligned with one another when the tubes are in a specified position. In this position the air inlet is open. In a different rotational position, the interstitial areas of one tube may cover the slit of the other tube. In this position the air inlet is closed.

If the slits of both tubes are aligned with one another, this creates a maximum opening for letting air into the device. If for example the inner tube is then rotated or shifted longitudinally, the overlaps of the slit are reduced, and the opening for letting air into the device is also reduced. The inner tube may be rotated or shifted so far that there is no longer any overlapping of the slit, i.e. there is no inlet available for letting in air.

The air inlet may control the amount of air flowing into the device and as a result control the process of carbonizing the biomass in the feed section.

As further implementations of the air inlet, one may use for example a flap, valve or similar. Rosette-type elements for ventilation may also be used.

According to a further refinement, the cooling device is a passive heat transfer means, such as a specified shape or surface in the wall area, and/or an active heat transfer means such as an electrical cooling device.

The advantage of a cooling device formed by the shape or surface of the wall area, e.g. contoured seams or curved bulges, is that the passive cooling effect of the outside air (wind, cold or damp air, rain etc.) may be utilized. The shape may be for example a cooling rib which forms an integral, thermally coupled part of the wall area, or similar. The surface of the entire wall area of the collection tank may for example be maximized in relation to its volume, in order for example to function as a cooling device around which the outside air flows.

Preferably the cooling device cools the solid converted product collected in the collection tank at least to the extent that it can be exposed to the surrounding air without any risk, i.e. without igniting when taken out. The ignition temperature is the temperature at which the solid converted product would spontaneously combust in the surrounding air.

According to a further refinement, the cooling device is a fluid cooling device, which is preferably provided at the wall area. The fluid cooling device may be active, e.g. a circulating pump, or passive, e.g. using convection.

According to a further refinement, at least in the inside of the device below the moving bed at least one capturing device, in particular a channel, is provided to capture and draw off a liquid converted product, in particular pyroligneous acid, water, acetic acid, acetone, methyl acetate, acetaldehyde or methanol which condenses on a vertical sidewall of the device.

Via a capturing device of this kind, a liquid converted product may be discharged, in addition to the solid converted product. During conversion of biomass, liquid converted products may accrue directly, or they initially may be gaseous/vaporous and then partially condense, generally in cooler areas, in particular on the sidewalls of the feed section. The liquid converted product then flows downwards and reaches the capturing device. The capturing device, e.g. a channel, may be inclined inwards relative to itself so that the liquid converted product(s) flow to its lowest point and can then be drawn off from there.

Preferably the channel inside the device is provided below the grate, on the funnel and/or on the pipe. The pipe may also be provided on or near the grate. Furthermore, a plurality of channels may be provided at various locations inside the conversion device.

According to a further refinement, a drainage means, in particular a siphon, drains off the liquid converted product. The siphon, e.g. a tube siphon or bottle siphon, may prevent gases, e.g. oxygen in the air, from entering the conversion device and may prevent gaseous converted products from escaping, while at the same time draining off the liquid converted product.

Thus liquids are drained off from the device in one direction only, while gas cannot enter the device through the drainage means, nor can any gaseous converted products escape from the device.

According to a further refinement, released gases are conveyed upwards through the feed section during operation and pass into a column or distiller above the feed section. There, at least one volatile converted product is partially precipitatable. To accomplish this, a drainage means (e.g. siphon) is provided to drain off the precipitated converted product.

Hence the device can extract solid, liquid and gaseous or volatile converted products by converting biomass, and can discharge them or drain them off.

The advantage of a column, i.e. a multiple distiller for distilling and fractionating gases having different condensation temperatures, is that different gaseous or vaporous converted products present during conversion may be distilled, fractionated or precipitated, e.g. water, acetic acid, acetone, methyl acetate, acetaldehyde or methanol. The advantage of a (simple) distiller is that a volatile mixture of converted products may be precipitated, e.g. pyroligneous acid, which essentially comprises acetic acid and water.

According to a further refinement, the column or distiller distils pyroligneous acid. The pyroligneous acid or the acetic acid therein may for example be conveyed to a biogas plant for methanogenesis.

One embodiment of a method for continuously converting biomass has the following steps: feed a moving bed of biomass, in particular wood, into a feed section; dry the moving bed in an upper section of the feed section; degas the moving bed in a flame zone in a middle section of the feed section;

carbonize the moving bed in a smolder zone in a lower section of the feed section to create a solid converted product, in particular charcoal; support the moving bed on a grate provided in the lower section of the shaft, and allow the solid converted product to pass downwards; wherein the solid converted product is collected in a collection tank, the collection tank is arranged below the grate, the collection tank is coupled with the feed section in a manner that is gas-tight relative to the surrounding air, and a wall area of the collection tank is cooled.

According to a further refinement, the biomass for the method described herein comprises chipped forestry wood and/or plantation wood and/or industrial wood and/or used wood or mixtures thereof.

According to a further refinement, the biomass for the method described herein comprises wood chips which are storable for a limited period of time and have a high moisture content, in particular chips having a moisture content >30%.

In one embodiment, a system including a conversion device described herein is used to carry out a method for continuously converting biomass in conjunction with a biogas plant and/or a combined heat and power plant, wherein a liquid converted product from the conversion of biomass, in particular pyroligneous acid or acetic acid, is conveyed to the biogas plant and/or a solid converted product from the conversion of biomass, in particular charcoal, is conveyed to a combined heat and power plant.

A combination of this kind comprising a conversion device, a biogas plant and a combined heat and power plant results in a flexible system which can generate heat energy and electrical power by using renewable energy with a high degree of efficiency. The conversion device can produce not only charcoal for the combined heat and power plant, which generates inter alia electrical power, but also pyroligneous acid or acetic acid for use in a biogas plant. The acetic acid may be conveyed to the biogas plant for methanogenesis. In the combined heat and power plant, the virtually soot-free combustion of charcoal is advantageous, since it means in particular that the combustion chamber and heat exchanger do not become as heavily sooted and therefore require less frequent maintenance. Moreover, the biogas plant can benefit from a by-product of the charcoal production, as the pyroligneous acid or acetic acid can be conveyed to it for use in controlling the chemical reactions occurring in it.

One embodiment of a conversion device described herein is used to convert wood chips into charcoal.

Referring now to FIG. 1, there is shown a conversion device 100 for continuously converting biomass 102 having a vertically standing, cylindrical feed section 104 which defines interior 106, a wall 108, a grate 110 forming a base, and, on the cover 112 of the feed section 104, a filling funnel 114 which can be closed off by a lid 116 so as to be gas-tight against the outside air. The filling funnel 114 is connected to the interior 106 of the feed section 104.

Furthermore, on the cover 112 a column 118, which is connected to feed section 104, is provided. Below grate 110, a funnel 120 is connected via its funnel wall 122 to the feed section 104.

A circumferential capturing channel 124 is provided on the inner side of funnel wall 122. It is inclined inwards relative to itself so that it has a lowest point 126. At this lowest point 126, a tube passes through funnel wall 122 to the outside, to a siphon 128.

A pipe 130 leading downwards is connected to the lower, narrow end of the funnel 120. The pipe 130 has a pipe wall 132, into which an air inlet 134 is inserted half way up. Connected to the lower end of the pipe 130 is a cuboid collection tank 136, which is removable and couplable with pipe 130 in a manner that is gas-tight against the surrounding air. Supports 138, of which two are visible in FIG. 1, support the conversion device 100. The wall areas of the collection tank 136 have cooling ribs 160.

Biomass 102, e.g. wood, wood pellets, chips or other carbon-containing feedstock, is fed continuously or in batches through filling funnel 114 into interior 106. At start-up, the device is filled to roughly ¾ full with biomass 102, which is then ignited. If the biomass 102 has a low bulk density, e.g. shavings or straw (e.g. bulk density of 100 kg/m$^3$), the biomass 102 is compressed by a press, then conveyed through the filling funnel 114, and interior 106 is nearly completely filled up. During operation, feed section 104 has three sections: an upper section 140, in which the biomass 102 is dried by rising warm vapors and gases 144 in the feed section 104. Below the upper section 140 is a middle section 142, which is a flame zone in which vapors, e.g. wood vapors and gases 144 from the biomass, escape and partially combust in the air flowing in from below through the air inlet 134. Below the middle section 142 is a lower section 146, which is a smolder zone in which the temperature is regulated to a temperature of 500-600° C. by air flowing in through the controlled air inlet 134, and in which further products present in the biomass are combusted and/or vaporized, and essentially a carbon concentrate 158, e.g. charcoal remains, which is so crumbly that it falls through the grate 110.

The carbon 158 falls through the grate 110 due to the pressure of the biomass 102 which is above it and following on after it, and due to gravity. Openings in the grate 110 are adjustable so that the size of the coals and the flow rate of the biomass 102 and of carbon 158 may be controlled by the size of the openings. Small openings having clearance of around 5 mm are suitable for example for coals from P16A wood chips (see Table 1). Large openings having clearance of around 10 mm are suitable for example for coals from P45A wood chips (see Table 1). The carbon 158 falls due to gravity through the funnel 120 and the pipe 130 directly into the collection tank 136. If the collection tank 136 is full, it is swapped with another, empty collection tank (not shown).

The air inlet 134 in pipe 130 as shown in FIG. 1 controls the inflow of air and oxygen into the interior 106. Due to the convective upward gas flow in the feed section 104, outside air is sucked in through the opened air inlet 134 and drawn upwards through the pipe 130 and the funnel 120 into the interior 160. No air reaches the collection tank 136, since it is itself gas-tight against the surrounding air and is coupled with pipe 130 in a manner that is gas-tight against the surrounding air, which means no draft or chimney effect can arise that might draw outside air downwards into the collection tank 136. Hence the charcoal 158 and carbon are cooled in the collection tank essentially under airless conditions. As a result the carbonization process dwindles rapidly in the collection tank.

The gaseous converted products 144 arising during conversion to some extent condense on the wall 108 and, along with other liquid converted products 156 (dotted lines), flow down the wall 108 due to gravity, through the grate 110, and from there into the channel 124 in the upper section of funnel 120. There, all liquid converted products 156 flow to the lowest point 126, and from there are drained off from the conversion device 100 via the siphon 128. Liquid held in the siphon 128 forms a gas-tight seal between the outside air and the inside of the funnel 120.

The collection tank 136 is surrounded by slat-like cooling ribs 160, which are provided on the wall areas of collection tank 136. The cooling ribs 160 increase the wall surface area that is effectively in contact with the outside air. As the collection tank 136 collects hot coals 158, the heat present in it is dispersed out into the outside air via the wall areas and cooling ribs 160.

Vapors and volatile converted products 144 to some extent rise further upwards in the interior 106 along with the released gases and pass into the column 118, where they are to some extent precipitated and fractionated into substances 148-154 (quantity of substances by way of example). The fractionated substances 148-154 are drawn off from column 118 via siphons (not shown). The residual released gases which have been purified in this way exit column 118 and are discharged into the surrounding air or subjected to further treatment.

All types of wood chips may be used as biomass 102. The origin, traded form and properties of wood chips are classified in DIN prEN 14961-1:2009 and in the hitherto customary Austrian standard ÖNORM M 7133, see Tables 1 and 2.

TABLE 1

Wood chip classes - particle size distribution, per DIN prEN 14961-1: 2009

| Class | At least 75% by mass in main material | Fines (<3.15 mm), percentage by mass | Coarse material (percentage by mass), maximum length of particles (mm) |
|---|---|---|---|
| P16A | 3.15 ≤ P ≤ 16 mm | ≤12% | ≤3% > 16 mm and all < 31.5 mm |
| P16B | 3.15 ≤ P ≤ 16 mm | ≤12% | ≤3% > 45 mm and all < 120 mm |
| P45A | 8 ≤ P ≤ 45 mm | ≤8% | ≤6% > 63 mm and maximum 3.5% > 100 mm, all < 120 mm |
| P45B | 8 ≤ P ≤ 45 mm | ≤8% | ≤6% > 63 mm and maximum 3.5% > 100 mm, all < 350 mm |
| P63 | 8 ≤ P ≤ 63 mm | ≤6% | ≤6% > 100 mm and all < 350 mm |
| P100 | 16 ≤ P ≤ 100 mm | ≤4% | ≤6% > 200 mm and all < 350 mm |

TABLE 2

Water content per DIN prEN 14961-1: 2009

| Class | Boundary value (water content in %) | Designation |
|---|---|---|
| M10 | ≤10% | Dried |
| M15 | ≤15% | |
| M20 | ≤20% | |
| M25 | ≤25% | |
| M30 | ≤30% | Suitable for storage |
| M35 | ≤35% | |
| M40 | ≤40% | Storable for only a limited period of time |
| M45 | ≤45% | — |
| M50 | ≤50% | — |
| M55 | ≤55% | — |
| M55+ | >55% | — |

The conversion device 100 converts not only small and dry wood chips, i.e. classes P16A to P45A and M10 to M30, into charcoal but also large and damp wood chips, i.e. classes P45B to P100 and M35 to M55 or M55+.

During conversion in feed section 104 the wood chips are simultaneously dried rapidly; this means the initial water content and moisture in the wood chips is of minor importance. Provided the filling funnel 114 and the interior 106 are large enough, the form (e.g. having fine material content, green material content, needle and leaf content) and size (e.g. P63, P100) of the wood chips to be converted in the conversion device 100 is of minor importance, since the charcoal produced may for example be ground and pressed into charcoal briquettes, independently of the initial form and size of the wood chips.

Figure 2A:
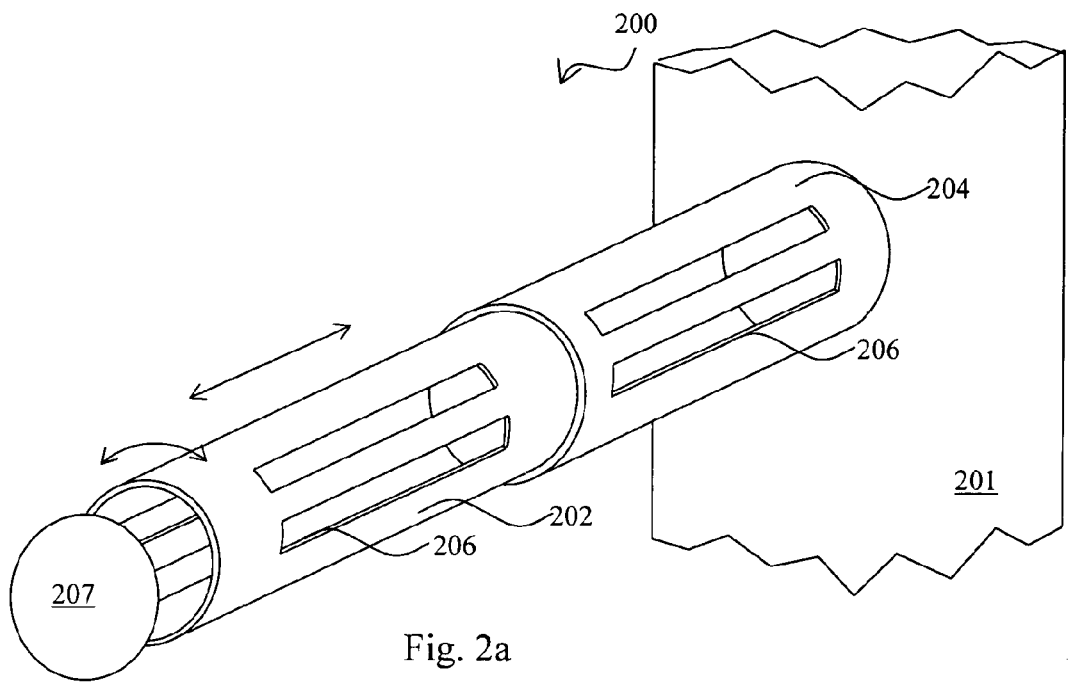
FIGS. 2a and 2b are views of an air inlet.

Referring now to FIG. 2a, there is shown an exploded perspective view of an air inlet 200. The air inlet 200 is provided in a pipe 201 and comprises two tubes 202, 204 which fit into one another and each have a longitudinal slit 206 in their sidewall. The inner tube 202 is closed off by a cap 207 on the end facing away from tube 201. The ends of tubes 202, 204 facing pipe 201 are open.

The inner tube 202 is rotatable relative to the outer tube 204, so that the longitudinal slits 206 of each tube 202, 204 are aligned with each other, or so that the interstitial spaces between the longitudinal slits 206 of a tube 202, 204 partially or completely cover those of the other tube.

Alternatively or additionally, the inner tube 202 may be shiftable in the longitudinal direction relative to the outer tube 206. This also allows the longitudinal slits 206 of each tube 202, 206 to be aligned with each other or to be covered by the interstitial spaces between the longitudinal slits 206 of the other tube 202, 204.

Hence the effective cross-section open to the outside air may be set by rotating and shifting the inner tube 202, and the quantity of air sucked into the conversion device may be controlled.

An actuating lever (not shown) may be provided to rotate the inner tube 202. Furthermore, the inner tube may be arranged on the pipe 201, and the outer tube may be rotatably and shiftably arranged around the inner tube. The cap 207 is then accordingly arranged on the outer tube on the end facing away from pipe 201.

Figure 2B:
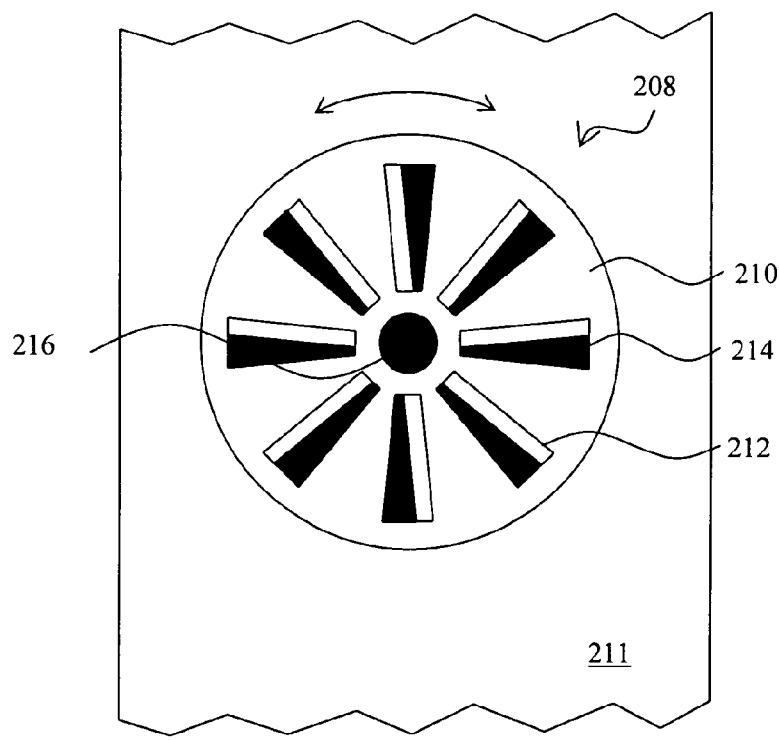

Referring now to FIG. 2b, there is shown a top view of a further air inlet 208. The air inlet 208 is designed as a plate 210 with radially arranged slits 212. The plate 210 is arranged in the pipe 211. Behind the plate 210 is a closure plate 214, which is rotatably mounted on plate 210. The closure plate 214 lies flat against plate 210 and has a rotary knob 216 which passes through the plate 210 from the rear to the front of plate 210, as shown in FIG. 2b. The closure plate 214 has the same slits as plate 210. In a specified rotational position of closure plate 214 relative to plate 210, the longitudinal slits of the plates are aligned so that a maximum opening for air intake is created and large amounts of air can be sucked into the conversion device 100. In another rotational position of closure plate 214, the interstitial spaces between the slits 212 of plates 210, 214 partially or completely cover the slits on the other plate, so that no air or only a small amount can enter. In an area between the two aforementioned rotational positions, the opening to the outside air is variable. The effective cross-section of the opening is used to control the amount of air that enters the conversion device 100. Rather than being positioned in the pipe 130, 201, 211 as explained above, the air inlet 134 may also be positioned at some other suitable place on the conversion device 100, e.g. in the funnel 120 or in the wall 108. Furthermore, an air inlet may be provided in a plurality of places.

Figure 3:
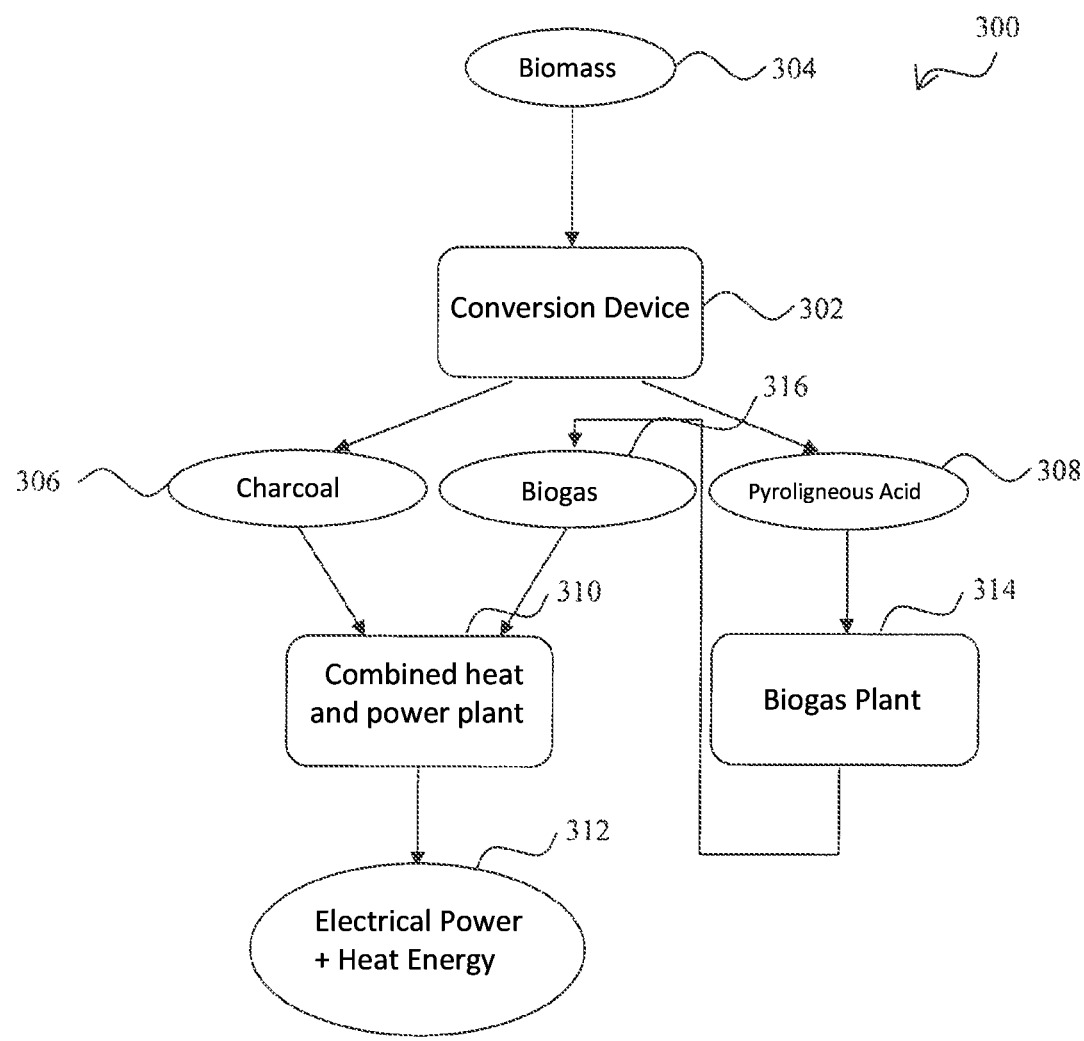
FIG. 3 is a block diagram of a system to continuously convert biomass.

Referring now to FIG. 3 there is shown a block diagram of a system 300 according to the invention. In the conversion device 302, biomass 304 is converted into solid, liquid and gases products, including charcoal 306 and pyroligneous acid 308. The charcoal 308 is used to operate a combined heat and power plant 310, which uses it to generate electrical power and/or heat energy 312. The pyroligneous acid 308 is used in a biogas plant 314 for methanogenesis. The biogas plant 314 generates biogas 316. The biogas 316 may also be combusted in the combined heat and power plant 310 and also used to generate electrical power 312.

Key to FIG. 3:

| | |
|---|---|
| 304 | Biomass |
| 302 | Conversion device |
| 306 | Charcoal |
| 316 | Biogas |
| 308 | Pyroligneous acid |
| 310 | Combined heat and power plant |
| 314 | Biogas plant |
| 312 | Electrical power + heat energy |

It is claimed:

1. A method for continuously converting biomass comprising:
   receiving a moving bed of biomass into a feed section;
   drying the moving bed of biomass in an upper section of the feed section;
   degassing the moving bed of biomass in a flame zone in a middle section of the feed section;
   carbonizing the moving bed of biomass in a smolder zone in a lower section of the feed section to create a solid converted product;
   supporting the moving bed of biomass on a grate below the lower section of the feed section, and the grate allowing the solid converted product to pass downwards
   collecting the solid converted product in a collection tank arranged below the grate, the collection tank coupled with the feed section in a manner that is gas-tight against the surrounding air and having a wall area that is cooled.

2. The method of claim 1 wherein the moving bed of biomass comprises at least one selected from the group including chipped forestry wood, plantation wood, industrial wood, used wood, and mixtures thereof.

3. The method of claim 1 wherein the moving bed of biomass comprises wood chips which can be stored for only a limited time and have a high moisture content greater than 30%.

4. The method of claim 1 further comprising:
   capturing in a capturing device a liquid converted product condensed on a vertical sidewall of an interior of the feed section resulting from the drying, the degassing and/or the carbonizing
   conveying the liquid converted product to a biogas plant, and/or
   conveying the solid converted product to a combined heat and power plant.

5. The method of claim 1 further comprising: converting wood chips into charcoal.

6. A device to continuously convert biomass comprising:
   a feed section to receive a moving bed of biomass, the feed section including
      an upper drying section,
      a middle flame zone for degassing and
      a lower smolder zone to carbonize the biomass into a solid converted charcoal product;
   a grate, which supports the moving bed of biomass and is permeable to the solid converted product in the downward direction;
   a collection tank to collect the solid converted product, such that the collection tank
      is arranged below the grate,
      is couplable with the feed section in a gas-tight manner, and
      has a wall area having a cooling device.

7. The device of claim 6, designed to convert biomass of differing sizes or bulk densities.

8. The device of claim 6 wherein the feed section is variable-sized and/or includes a filling height controller and/or includes a compression or loosening device, and/or wherein the grate is adjustable in size.

9. The device of claim 6 wherein the collection tank is connected to the feed section via a funnel the wide end of which faces the feed section, and/or a pipe.

10. The device of claim 6 wherein the collection tank is detachably coupled with the feed section and/or a discharge device is provided on the collection tank to allow the solid converted product to be removed.

11. The device of claim 6 wherein at least one air inlet is situated between the grate and the collection tank, through which a controllable amount of air is dispersed.

12. The device of claim 6 wherein the cooling device is a passive heat transfer device and/or an active heat transfer device.

13. The device of claim 12 wherein the passive heat transfer device is a specified shape or surface of the wall area.

14. The device of claim 12 wherein the active heat transfer device is an electrical cooling device.

15. The device of claim 6 wherein the cooling device is a fluid cooling device.

16. The device of claim 6 wherein the interior of the device below the moving bed of biomass includes at least one capturing device to capture and draw off to the outside a liquid converted product which has condensed on a vertical sidewall of the interior of the device resulting from the continuous conversion of the bed of biomass.

17. The device of claim 16 wherein the capturing device is a channel.

18. The device of claim 16 wherein the liquid converted product is at least one selected from the group including pyroligneous acid, water, acetic acid, acetone, methyl acetate, acetaldehyde and methanol.

19. The device of claim 16 further including a draining device to drain off the liquid converted product.

20. The device of claim 19 wherein the draining device is a gas-tight siphon.

21. The device of claim 6 wherein during operation released gases are conveyed upwards through the feed section pass into a column or a distiller above the feed section, and there at least one volatile converted product from the released gas is at least partially precipitatable, and the device further comprising a removal device to draw off the precipitated converted product.

22. The device of claim 21 wherein released gases are conveyed upwards through the feed section into the distiller and the distiller distils pyroligneous acid.

23. The device of claim 21 wherein the removal device is a gas-tight siphon.

* * * * *

UNITED STATES PATENT AND TRADEMARK OFFICE
CERTIFICATE OF CORRECTION

PATENT NO. : 8,986,507 B2  Page 1 of 1
APPLICATION NO. : 13/266748
DATED : March 24, 2015
INVENTOR(S) : Schottdorf It is certified that error appears in the above-identified patent and that said Letters Patent is hereby corrected as shown below:

Title page, replace "PCT Filed: March 10, 2010" with --PCT Filed: March 8, 2010--.

Signed and Sealed this
Twenty-eighth Day of July, 2015

Michelle K. Lee
*Director of the United States Patent and Trademark Office*